(12) United States Patent
Park et al.

(10) Patent No.: US 8,958,041 B2
(45) Date of Patent: Feb. 17, 2015

(54) DISPLAY APPARATUS WITH DATA LINE AND COMMON LINE FORMED IN A SAME LAYER

(75) Inventors: Yong-Han Park, Anyang-si (KR); Yong-Gi Park, Siheung-si (KR); Seok-Je Seong, Yongin-si (KR); Min-Kyung Jung, Suwon-si (KR)

(73) Assignee: Samsung Display Co., Ltd., Yongin, Gyeonggi-Do (KR)

( * ) Notice: Subject to any disclaimer, the term of this patent is extended or adjusted under 35 U.S.C. 154(b) by 674 days.

(21) Appl. No.: 12/030,080

(22) Filed: Feb. 12, 2008

(65) Prior Publication Data

US 2008/0259261 A1 Oct. 23, 2008

(30) Foreign Application Priority Data

Apr. 23, 2007 (KR) .................. 10-2007-0039419

(51) Int. Cl.
*G02F 1/1343* (2006.01)
*G02F 1/1362* (2006.01)
*G02F 1/1337* (2006.01)

(52) U.S. Cl.
CPC .... *G02F 1/136286* (2013.01); *G02F 1/134363* (2013.01); *G02F 1/133707* (2013.01); *G02F 1/134336* (2013.01); *G02F 2001/134372* (2013.01); *G02F 2201/40* (2013.01); *G02F 2203/64* (2013.01)
USPC ............................ 349/141; 349/139; 349/144

(58) Field of Classification Search
USPC ...................... 349/129, 139, 141, 144, 38, 39
See application file for complete search history.

(56) References Cited

U.S. PATENT DOCUMENTS

| 6,118,508 | A  | * | 9/2000 | Park ............................... 349/141 |
| 2003/0098939 | A1 | * | 5/2003 | Min et al. ....................... 349/141 |
| 2003/0117558 | A1 | * | 6/2003 | Kim et al. ...................... 349/141 |
| 2003/0133066 | A1 | * | 7/2003 | Ono et al. ...................... 349/141 |
| 2004/0125300 | A1 | * | 7/2004 | Lee ................................. 349/141 |
| 2004/0125306 | A1 | * | 7/2004 | Kim ............................... 349/141 |
| 2005/0140903 | A1 | * | 6/2005 | Park et al. ...................... 349/141 |
| 2007/0153197 | A1 | * | 7/2007 | Park et al. ...................... 349/141 |

FOREIGN PATENT DOCUMENTS

| JP | 09120081 | 5/1997 |
| JP | 11167127 | 6/1999 |
| JP | 2002258307 | 9/2002 |
| JP | 2003207797 | 7/2003 |
| WO | 01/18597 | 3/2001 |

* cited by examiner

*Primary Examiner* — Jessica M Merlin
(74) *Attorney, Agent, or Firm* — F. Chau & Associates, LLC

(57) ABSTRACT

A display apparatus includes a gate line, a data line crossing the gate line and a pixel area. A common electrode and a pixel electrode are overlapped with each other and formed in the pixel area. The common electrode and the pixel electrode receive different voltages. The data line includes a first data line through which a voltage is applied to the common electrode and a second data line through which a voltage is applied to the pixel electrode. The first data line crosses the pixel area to minimize an area where the first data line is formed, thereby improving an aperture ratio of the display apparatus.

22 Claims, 24 Drawing Sheets

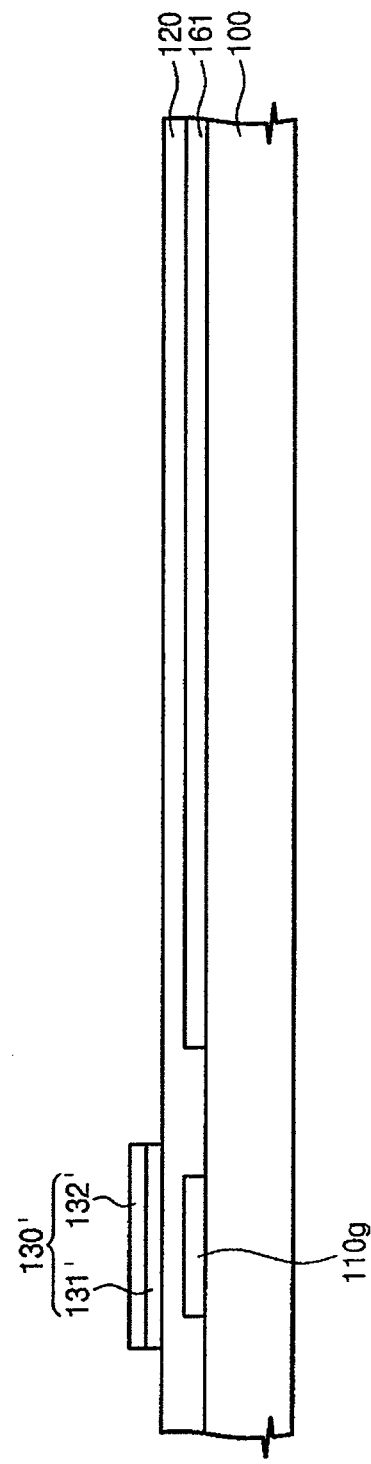

DISPLAY APPARATUS WITH DATA LINE AND COMMON LINE FORMED IN A SAME LAYER

CROSS-REFERENCE TO RELATED APPLICATION

This application claims to priority under 35 U.S.C. §119 to Korean Patent Application No. 2007-39419 filed on Apr. 23, 2007 in the Korean Intellectual Property Office (KIPO), the contents of which are herein incorporated by reference in their entirety.

BACKGROUND OF THE INVENTION

1. Technical Field

The present invention relates to a display apparatus and a method of fabricating the same, and more particularly, to a display apparatus capable of displaying a high-quality image.

2. Discussion of the Related Art

A display apparatus, such as a liquid crystal display, a plasma display panel, an electroluminescent display, etc., includes a plurality of pixel areas to display an image. The pixel areas are separated from each other, and receive image signals. Thus, the pixel areas display images in response to the image signals. A signal line is arranged in each of the pixel areas.

The signal line includes a metal material having a good conductivity to transmit signals therethrough. The metal material may have a light blocking property, so that the signal line blocks light passing therethrough. In the display apparatus, an aperture ratio indicates a ratio of a portion contributing to the transmission of illumination light emitted from a backlight with respect to one pixel area. When the aperture ratio increases, the illumination light emitted from the backlight largely passes through the aperture, thereby displaying the high-quality image. However, as portions having the light blocking material such as the signal line increase, the aperture ratio decrease, so that the image quality of the display apparatus may be lowered.

SUMMARY OF THE INVENTION

Embodiments of the present invention provide a display apparatus capable of displaying a high-quality image and a method of fabricating the display apparatus.

In an exemplary embodiment of the present invention, a display apparatus includes a first substrate, a gate line, a first insulating interlayer, a first data line, a second data line, a common electrode, a second insulating interlayer, a pixel electrode, and a second substrate.

The first substrate includes a pixel area. The gate line is formed on the first substrate. The first insulating interlayer is formed on the first substrate to cover the gate line. The first data line is formed on the first insulating interlayer and crosses the pixel area. The second data line is formed on the first insulating interlayer to form the pixel area with the gate line, and the common electrode receives a voltage through the first data line. The second insulating interlayer is formed on the first insulating interlayer and covers the first and second data lines. The pixel electrode is formed on the second insulating interlayer and receives a voltage through the second data line. The second substrate is coupled with the first substrate.

In an exemplary embodiment of the present invention, a method of fabricating a display apparatus is provided as follow. A gate line is formed on a first substrate where a pixel area is defined, and a common electrode is formed on the first substrate. The common electrode is spaced apart from the gate line. A first insulating interlayer is formed to cover the gate line and the common electrode, and the first insulating interlayer includes a contact hole formed therethrough to expose the common electrode. A first data line is formed on the first insulating interlayer. The first data line crosses the pixel area, and is electrically connected to the common electrode through the contact hole. A second data line is formed on the first insulating interlayer to define the pixel area with the gate line, and a second insulating interlayer is formed to cover the first and second data lines. A pixel electrode is formed on the second insulating interlayer, and a second substrate is coupled with the first substrate.

In an exemplary embodiment of the present invention, a method of fabricating a display apparatus is provided as follows. A gate line is formed on a first substrate where a pixel area is defined, and a first insulating interlayer is formed on the first substrate to cover the gate line. A common electrode is formed on the first insulating interlayer. A first data line is formed on the first insulating interlayer to cross the pixel area, and the first data line is directly connected to the common electrode. A second data line is formed on the first insulating interlayer to define the pixel area with the gate line. A second insulating interlayer is formed on the first substrate to cover the common electrode, the first data line, and the second data line. A pixel electrode is formed on the second insulating interlayer, and a second substrate is coupled with the first substrate.

According to the above, the liquid crystal display may have an improved aperture ratio, thereby displaying a high-quality image thereon.

BRIEF DESCRIPTION OF THE DRAWINGS

Exemplary embodiments of the present invention can be understood in more detail from the following descriptions taken in conjunction with the accompanying drawings, in which:

FIGS. 7A to 7H are sectional views illustrating a method of manufacturing the liquid crystal display of FIG. 3;

DESCRIPTION OF EXEMPLARY EMBODIMENTS

The invention is described more fully hereinafter with reference to the accompanying drawings, in which exemplary embodiments of the invention are shown. This invention may, however, be embodied in many different forms and should not be construed as limited to the embodiments set for the herein.

Figure 1:
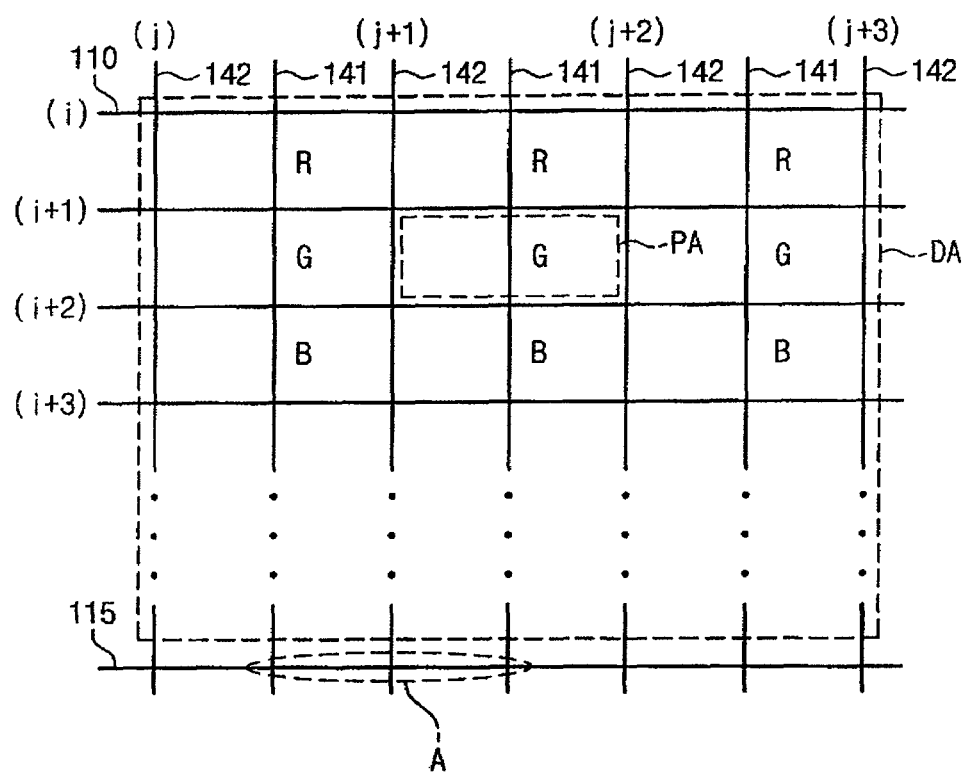
FIG. 1 is a plan view showing a liquid crystal display according to an exemplary embodiment of the present invention.

FIG. 1 is a plan view showing a liquid crystal display according to an exemplary embodiment of the present invention.

Referring to FIG. 1, a liquid crystal display includes a display area DA where an image is displayed. The display area DA includes a plurality of pixel areas PA. The signal lines include a plurality of gate lines 110, a plurality of first data lines 141 and a plurality of second data lines 142. The gate lines 110 extend in a row direction and are arranged along a column direction. The first and second data lines 141 and 142 extend in the column direction and are arranged along the row direction. The first data lines 141 cross inside the pixel areas PA, respectively, and the gate lines 110 and the second data lines 142 are positioned between the pixel areas PA.

In an exemplary embodiment, when the gate lines 110, the first data lines 141 and the second data lines 142 are classified by row and column numbers, the pixel areas PA may be defined by the row number of a corresponding data line and the column number of a corresponding gate line. For example, (i, j)-th pixel area may be defined by i-th and (i+1)-th gate lines 110 and j-th and (j+1)-th second data lines 142.

Each of the pixel areas has a rectangular shape of which a length in the row direction is longer than a length in the column direction. Each of the pixel areas displays at least one color of red R, green G and blue B colors. The pixel areas arranged in the same row may display the same color, and the pixel areas arranged in the same column may display a different color from that of adjacent pixel areas thereto. For example, (i, j)-th, (i, j+1)-th and (i, j+2)-th pixel areas PA display the red color R, (i+1, j)-th, (i+1, j+1)-th and (i+1, j+2)-th pixel areas PA display the green color G, and (i+2, j)-th, (i+2, j+1)-th and (i+2, j+2)-th pixel areas PA display the blue color B. Three pixel areas adjacent to each other in the column direction form one main pixel area. For example, (i, j)-th, (i+1, j)-th and (i+2, j)-th pixel areas are defined as one main pixel area. The main pixel area may display various colors by combining the red, green and blue colors R, G and B.

Gate signals are applied through the gate lines 110, and data signals are applied through the first and second data lines 141 and 142. The gate signals are generated by a gate driver (not shown) and the data signals are generated by a data driver (not shown). The gate driver may be formed with the signal lines through a thin film process. The data driver may be formed as a chip.

When each of the pixel areas PA has the rectangular shape where the length in the row direction is longer than the length in the column direction, the number of the gate lines 110 increases and the number of the first and second data lines 141 and 142 decreases. When the number of the first and second data lines 141 and 142 decreases, the number of the chips for the data driver may be reduced, thereby improving the efficiency of the manufacturing process for the liquid crystal display.

Figure 2:
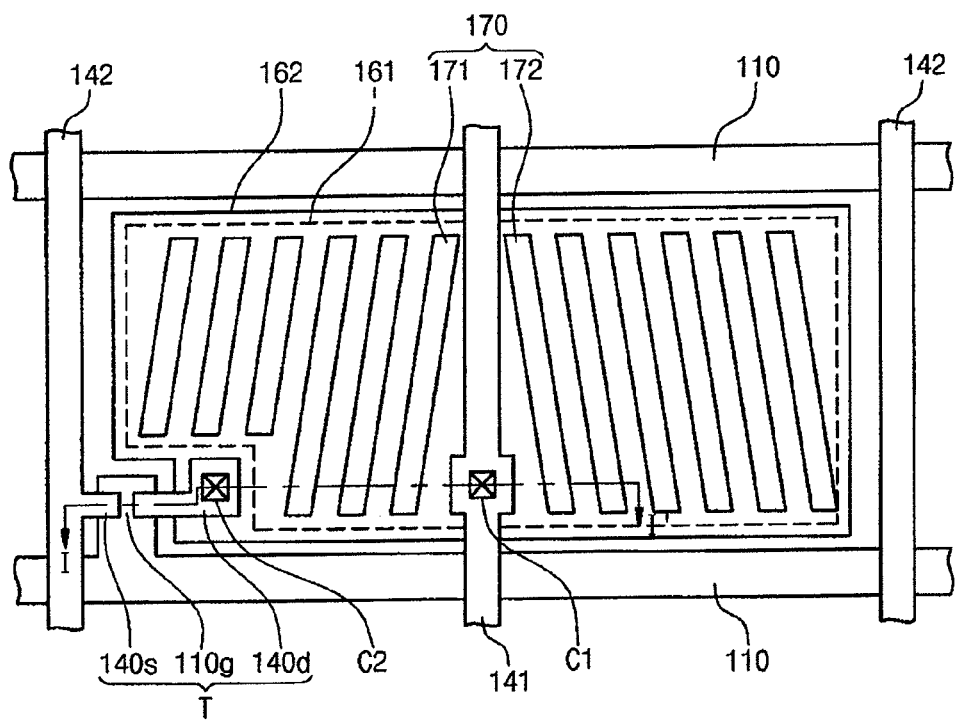
FIG. 2 is an enlarged plan view showing a pixel area of FIG. 1 according to an exemplary embodiment of the present invention.

FIG. 2 is an enlarged plan view showing one pixel area of FIG. 1 according to an exemplary embodiment of the present invention.

Referring to FIG. 2, each of the pixel areas PA includes a thin film transistor T, a common electrode 161 and a pixel electrode 162. The thin film transistor T includes a gate electrode 110g, a source electrode 140s and a drain electrode 140d. The gate electrode 110g branches from the gate line 110, and the source electrode 140s branches from the second data line 142. The drain electrode 140d is spaced apart from the source electrode 140s with the gate electrode 110g therebetween. The common electrode 161 overlaps the pixel electrode 162 to cover the pixel areas PA.

The common electrode 161 is electrically connected to the first data line 141 through a first contact hole C1. The pixel electrode 162 is electrically connected to the second data line 142 through a second contact hole C2.

The pixel electrode 162 includes a plurality of cut-away portions 170 formed therethrough. The cut-away portions 170 include a first cut-away portion 171 and a second cut-away portion 172. The first and second cut-away portions 171 and 172 are inclined with respect to the gate line 110. The first data line 141 divides the pixel area PA into two regions, and the first cut-away portion 171 and the second cut-away portion 172 are substantially symmetrical with each other with respect to the first data line 141.

Figure 3:
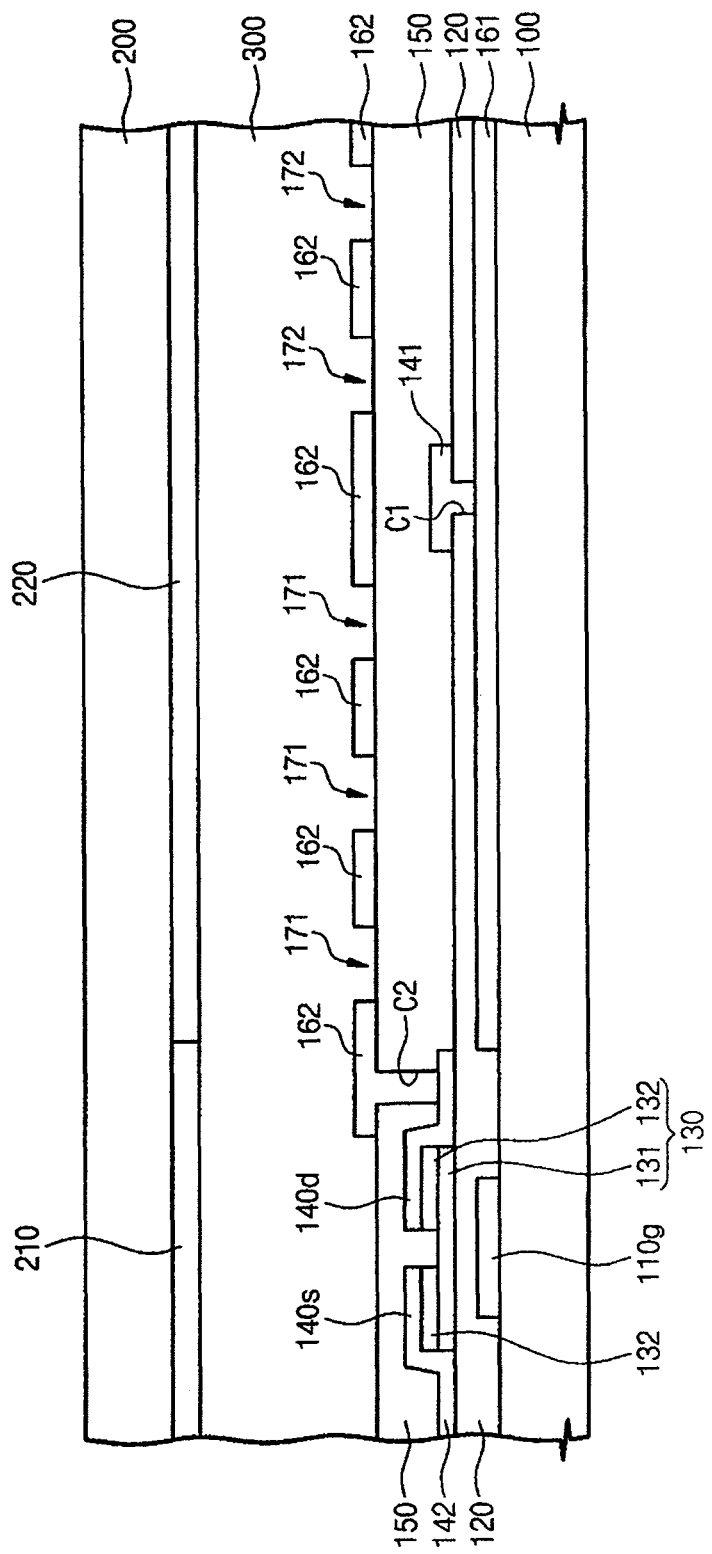
FIG. 3 is a cross-sectional view taken along a line I-I' of FIG. 2.

FIG. 3 is a cross-sectional view taken along a line I-I' of FIG. 2.

Referring to FIG. 3, the liquid crystal display includes a first substrate 100, a second substrate 200 facing the first substrate 100, and a liquid crystal layer 300 interposed between the first and second substrates 100 and 200. The gate electrode 110g and the common electrode 161 are formed on the first substrate 100 and spaced apart from each other. The gate electrode 110g and the common electrode 161 are covered by a gate insulating layer 120. The gate insulating layer 120 is partially removed to form the first contact hole C1 at an area where the common electrode 161 is formed.

The data line 141 and a semiconductor pattern 130 are formed on the gate insulating layer 120. The first data line 141 is electrically connected to the common electrode 161 through the first contact hole C1. The semiconductor pattern 130 partially overlaps the gate electrode 110g. The semiconductor pattern 130 includes an active pattern 131 having an intrinsic semiconductor and an ohmic contact pattern 132 having impurities. The ohmic contact pattern 132 is divided into two portions, and the source and drain electrodes 140s and 140d are formed along the divided two portions, respectively. The second data line 142 is connected to an end portion of the source electrode 140s.

The source electrode 140s, the drain electrode 140d, and the first and second data lines 141 and 142 are covered by a protective layer 150. The protective layer 150 includes the second contact hole C2 to partially expose the drain electrode 140d. The gate insulating layer 120 and the protective layer 150 may include, for example, a transparent inorganic material. The gate insulating layer 120 and the protective layer 150 may include transparent silicon nitride or transparent silicon oxide. The gate insulating layer 120 and the protective layer 150 function as an insulating interlayer to insulate patterns formed thereon and therebelow. The pixel electrode 162 is formed on the protective layer 150. The pixel electrode 162 is electrically connected to the drain electrode 140d through the second contact hole C2.

A black matrix pattern 210 and a color filter 220 are formed on the second substrate 200. The black matrix pattern 210 covers a region between the pixel areas PA and blocks light passing through the region between the pixel areas PA. The black matrix pattern 210 covers the thin film transistor T and blocks light incident into a channel area of the thin film transistor T. The color filter 220 may include, for example, red, green and blue color filters that are alternately arranged in the pixel areas PA in a one-to-one correspondence.

Figure 4A:
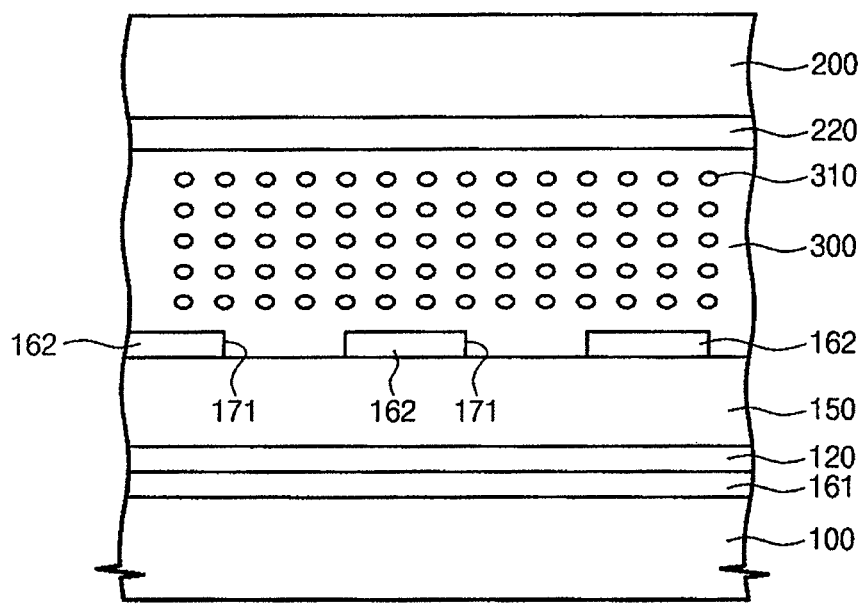
FIGS. 4A and 4B are partially enlarged sectional views illustrating operation of the liquid crystal display of FIG. 3.
Figure 4B:
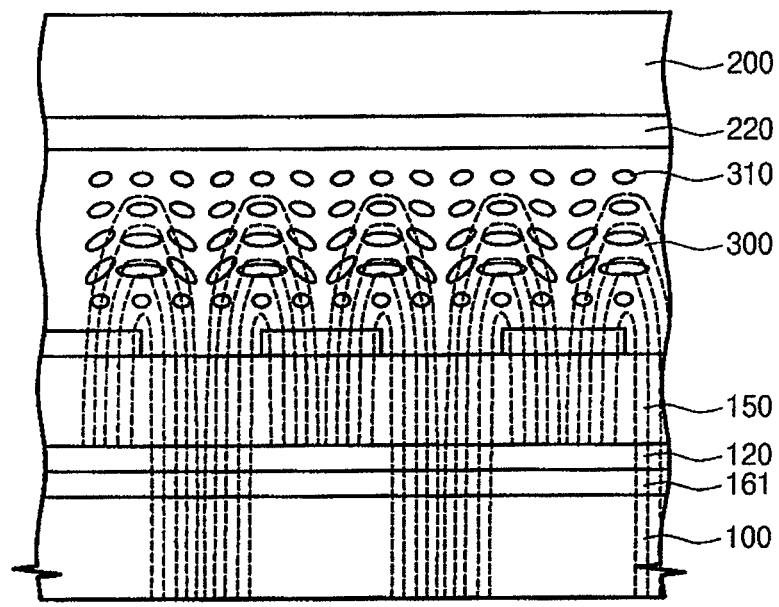

FIGS. 4A and 4B are partially enlarged sectional views illustrating operation of the liquid crystal display of FIG. 3.

Referring to FIG. 4A, the liquid crystal display is maintained in a black state or a white state according to an electric field applied to the liquid crystal layer 300. When the electric field is not applied to the liquid crystal layer 300, the liquid crystal display is maintained in the black state. Liquid crystal molecules 310 of the liquid crystal layer 300 are aligned in a direction substantially parallel to the first and second substrates 100 and 200. Each of the liquid crystal molecules 310 has an oval shape having a longer axis and a shorter axis, and the aligning direction of the liquid crystal molecules 310 is defined by the longer axis.

When the liquid crystal display is maintained in the black state, there is no phase variation of the light passing through the liquid crystal layer 300. Polarizing plates that have light absorbing axes vertical to each other are attached onto outer surfaces of the first and second substrates 100 and 200, respectively. In the black state, the light passing through the liquid crystal layer 300 does not exit through the liquid crystal display, so that the liquid crystal display is maintained in a dark state.

Referring to FIG. 4B, the gate signal is applied to the gate line 110. Thus, the thin film transistor T is turned on. The data signal is applied to the second data line 142, and a data voltage corresponding to image information is applied to the pixel electrode 162 through the thin film transistor T. A common voltage is applied to the common electrode 161 through the first data line 141. The electric field is applied to the liquid crystal layer 300 due to a voltage difference between the common voltage applied to the common electrode 161 and the data voltage applied to the pixel electrode 162.

As shown in FIG. 4B, the electric field has a parabola shape of which a center of the electric field is upwardly convexed. The liquid crystal molecules 310 have a dielectric anisotropy and are twisted by the electric field. Since the liquid crystal molecules 310 have a refractive anisotropy, the phase of the light passing through the liquid crystal layer 300 varies. The light exits through the polarizing plate attached to the second substrate 200, so that the liquid crystal display is maintained in the white state.

As shown in FIG. 4B, the electric field is formed at an exposed region through the cut-away portion 170 that is not covered by the pixel electrode 162. Thus, a direction in which the liquid crystal molecules 310 are twisted may vary according to a direction along which the cut-away portion 170 is formed.

Referring again to FIG. 2, the first and second cut-away portions 171 and 172 are substantially symmetrical with each other with respect to the first data line 141.

When a region where the first cut-away portion 171 is formed is defined as a first sub area and a region where the second cut-away portion 172 is formed is defined as a second sub area, the direction in which the liquid crystal molecules 310 are twisted in the first sub area is substantially symmetrical with the direction in which the liquid crystal molecules 310 are twisted in the second sub area. Therefore, optical properties in the first and second sub areas may be compensated with each other.

The first data line 141 includes, for example, a metal material having good conductivity to transmit the common voltage therethrough. The metal material having the good conductivity may block the light passing through the first data line 141, so that the aperture ratio of the pixel area PA may be reduced by the region in which the first data line 141 is formed. In an exemplary embodiment, the first data line 141 is formed in a direction substantially perpendicular to a longitudinal side of the pixel area PA. Thus, the region where the first data line 141 is formed may be minimized, thereby improving the aperture ratio of the liquid crystal display.

The first data line 141 is positioned between the first and second sub areas. The liquid crystal molecules 310 positioned between the first and second sub areas are scattered since the liquid crystal molecules 310 are controlled by both first and second cut-away portions 171 and 172. Although the liquid crystal display is maintained in the white state, the light does not pass between the first and second sub areas, so that the region between the first and second sub areas is maintained in the black state. Thus, although the first data line 141 is formed crossing the pixel area PA, the aperture ratio of the liquid crystal display may not be further reduced by the first data line 141 since the first data line 141 is formed in the region between the first and second sub areas, which is maintained in the black state.

The liquid crystal display according to an exemplary embodiment may maintain the maximum aperture ratio, so that the high-quality image may be displayed on the liquid crystal display.

Figure 5:
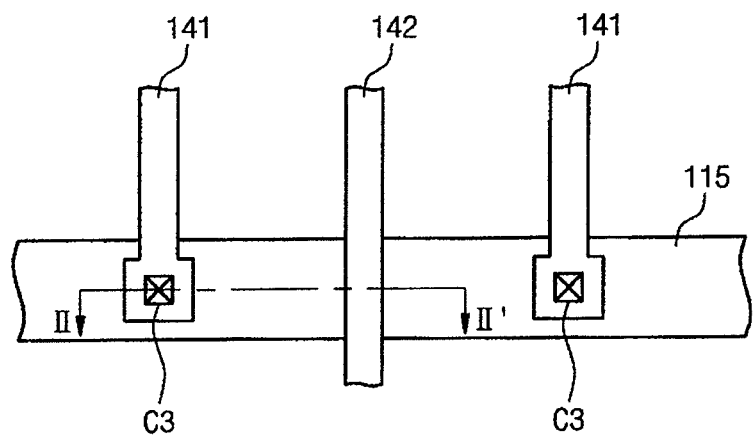
FIG. 5 is an enlarged view of a portion 'A' of FIG. 1.
Figure 6:
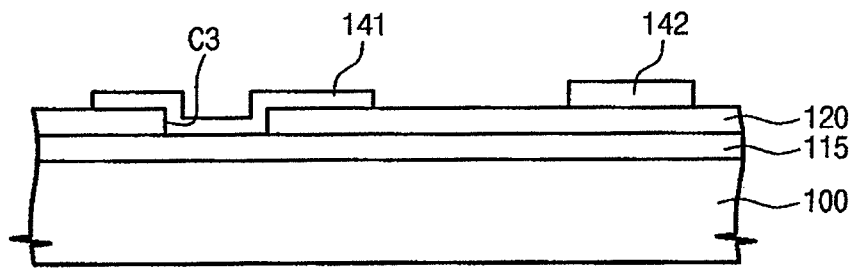
FIG. 6 is a cross-sectional view taken along a line II-II' of FIG. 6.

FIG. 5 is an enlarged view of a portion 'A' of FIG. 1, and FIG. 6 is a cross-sectional view taken along a line II-II' of FIG. 5.

Referring to FIG. 5, a sub-line 115 is formed at a peripheral area outside the display area DA and overlaps an end portion of the first data line 141. The sub-line 115 extends in a direction substantially perpendicular to the first data line 141 and may include a same material as the gate line 110. The first data line 141 is electrically connected to the sub-line 115 through a third contact hole C3. The second data line 142 crosses the sub-line 115.

Referring to FIG. 6, the sub-line 115 is formed on the first substrate 100. The sub-line 115 is covered by the gate insulating layer 120. The gate insulating layer 120 includes the third contact hole C3 formed therethrough, and the first data line 141 is electrically connected to the sub-line 115 through the third contact hole C3. The second data line 142 is electrically insulated from the sub-line 115 by the gate insulating layer 120.

FIGS. 7A to 7H are sectional views illustrating a method of fabricating the liquid crystal display of FIG. 3.

Figure 7A:
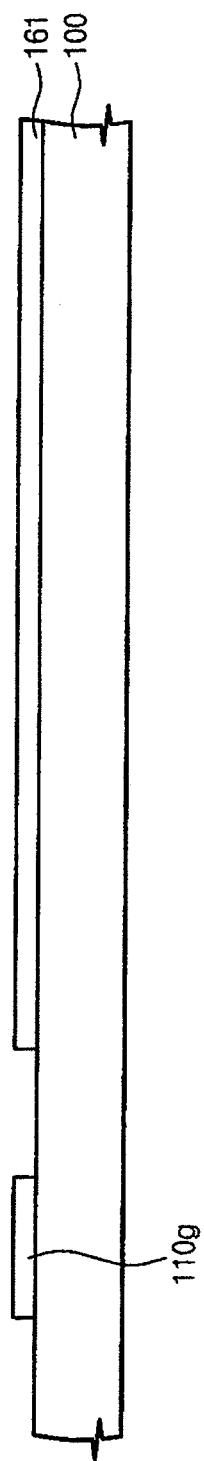

Referring to FIG. 7A, a transparent conductive layer is formed on the first substrate 100. The transparent conductive layer may include, for example, indium tin oxide or indium zinc oxide. The first substrate 100 may include, for example, a transparent material such as glass, plastic or the like. The transparent conductive layer is deposited on the first substrate 100 through a sputtering method. A photoresist layer is coated on the first substrate 100 where the transparent conductive layer is formed. The photoresist layer is patterned through exposure and development processes to form a photoresist pattern. When the transparent conductive layer is etched using the photoresist pattern as an etch mask, the common electrode 161 is formed.

A gate conductive layer is formed on the first substrate 100 where the common electrode 161 is formed. The gate conductive layer may include, for example, chromium, aluminum, aluminum alloy, molybdenum, or a combination thereof. The gate conductive layer may be formed in a single-layer or multilayer structure. The gate conductive layer is etched to form the gate electrode 110g. When the gate conductive layer is etched, the gate line 110 is formed with the gate electrode 110g. In an exemplary embodiment, the gate electrode 110g may be formed before forming of the common electrode 161.

Referring to FIG. 7B, the gate insulating layer 120 and the semiconductor layer are sequentially formed on the first substrate 100 where the gate electrode 110g and the common electrode are formed through a plasma enhanced chemical vapor deposition method.

The gate insulating layer 120 may include, for example, an inorganic material such as silicon nitride, silicon oxide or the like. The semiconductor layer has a double-layer structure of the active layer and the ohmic contact layer. The semiconductor layer is etched to form a preliminary semiconductor pattern 130'. The preliminary semiconductor pattern 130' is formed in a predetermined area above the gate electrode 110g, and includes a preliminary active pattern 131' and a preliminary ohmic contact pattern 132'.

Figure 7C:
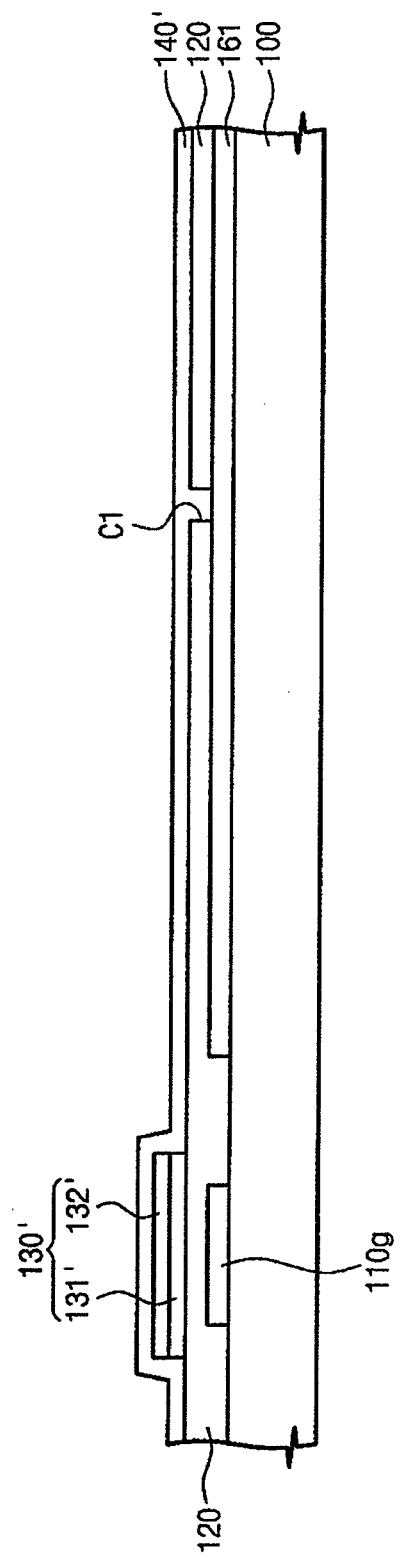

Referring to FIG. 7C, the gate insulating layer 120 is etched to form the first contact hole C1 through which the common electrode 161 is exposed. A data conductive layer 140' is formed over the first substrate 100, and the first contact hole C1 is filled with the data conductive layer 140'. The data conductive layer 140' may be formed through a same process as the gate conductive layer.

Figure 7D:
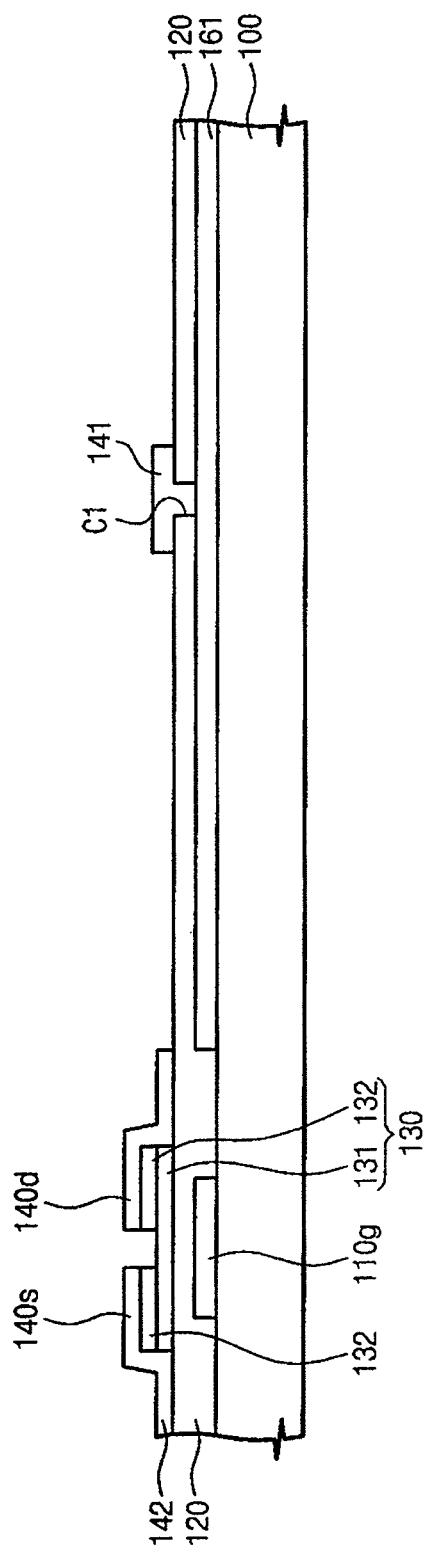

Referring to FIG. 7D, the data conductive layer 140' is etched, so that the source electrode 140s, the drain electrode 140d, the first data line 141, and the second data line 142 are formed. The first data line 141 is electrically connected to the common electrode 161 through the first contact hole C1. The preliminary semiconductor pattern 130' is etched along the source electrode 140s and the drain electrode 140d, so that the semiconductor pattern 130 is formed. The preliminary ohmic contact pattern 132' is etched to form an ohmic contact pattern 132. The preliminary ohmic contact pattern 132' may be formed when the preliminary semiconductor pattern 130' is etched. The semiconductor pattern 130 includes the active pattern 131 and the ohmic contact pattern 132.

Figure 7E:
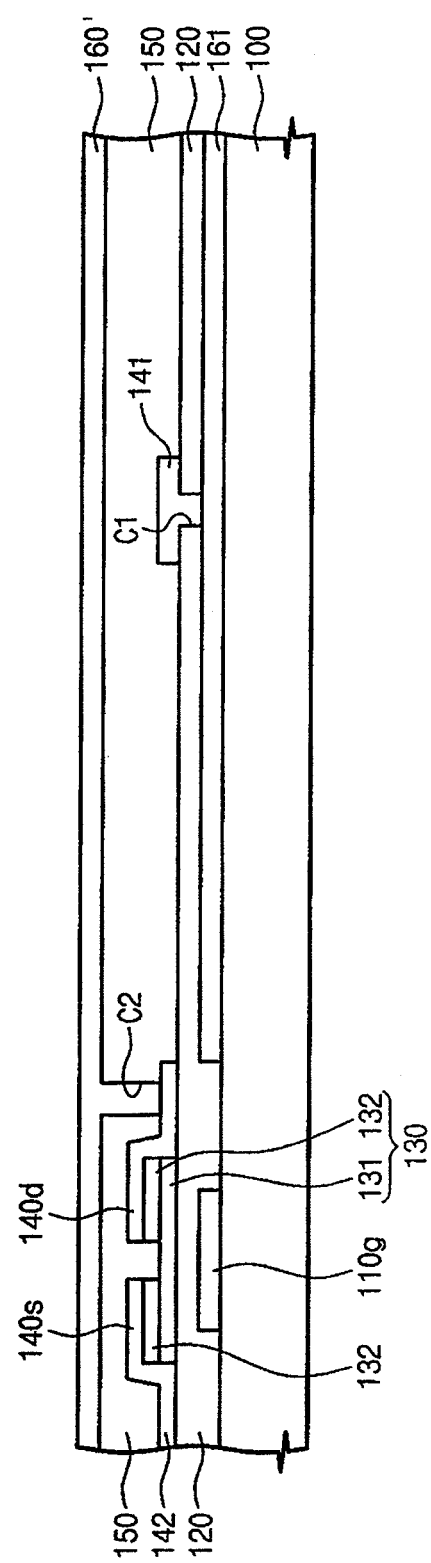

Referring to FIG. 7E, the protective layer 150 is formed over the first substrate 100. The protective layer 150 may include a same material as the gate insulating layer 120 and be formed through a same process as the gate insulating layer 120. The protective layer 150 is etched to form the second contact hole C2 through which the drain electrode 140d is exposed. The transparent conductive layer 160' is formed over the first substrate 100, and the second contact hole C2 is filled with the transparent conductive layer 160'. The transparent conductive layer 160' may include a same material as the common electrode 161 and be formed through a same process as the common electrode 161.

Figure 7F:
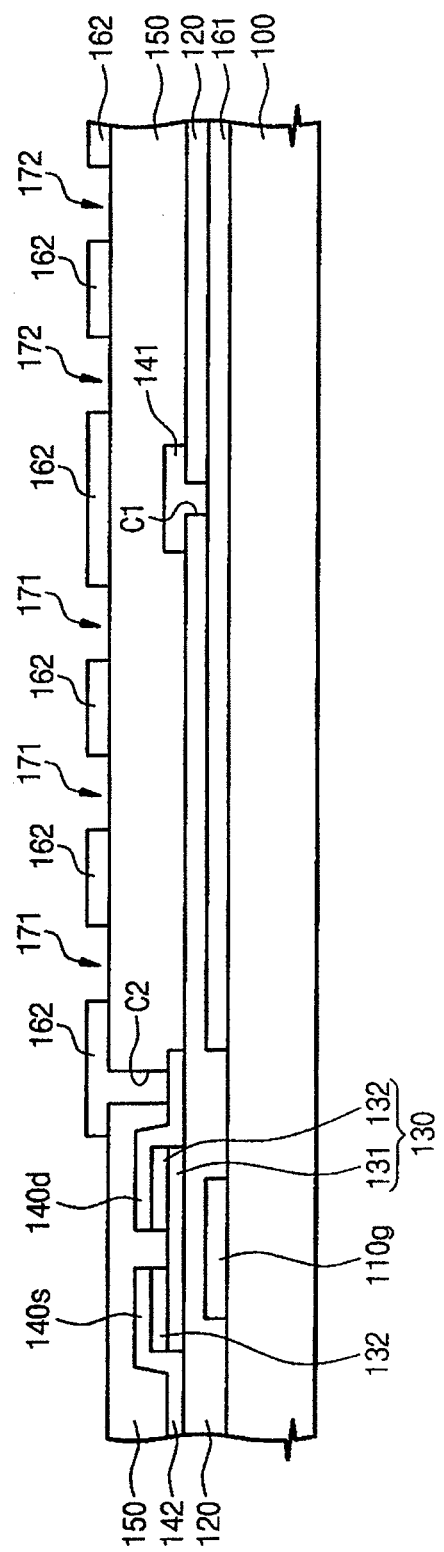

Referring to FIG. 7F, the transparent conductive layer 160' is etched to form the pixel electrode 162. The pixel electrode 162 is electrically connected to the drain electrode 140d through the second contact hole C2. The pixel electrode 162 is partially removed to form the cut-away portion 170.

Figure 7G:
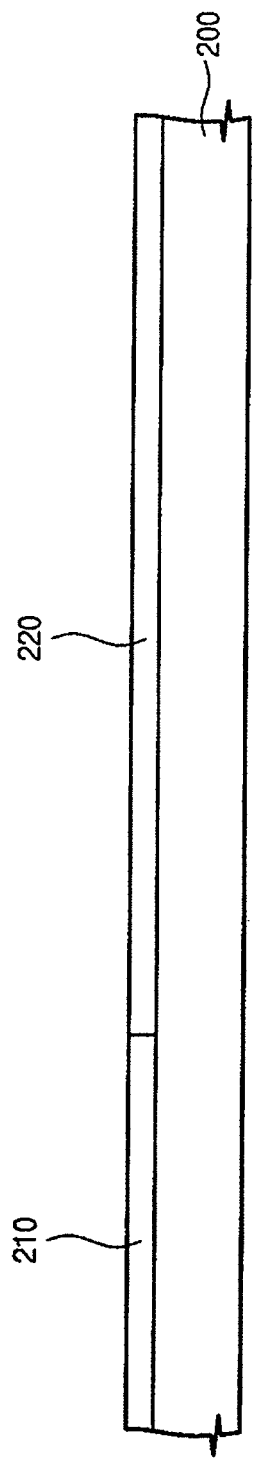

Referring to FIG. 7G, the black matrix pattern 210 is formed on the second substrate 200. In an exemplary embodiment, a black matrix layer is formed over the second substrate 200 and patterned through exposure and development processes without an additional etching process. The black matrix layer may include a photoresist. A color layer is coated over the second substrate 200, and the color layer is patterned through exposure and development processes to form the color filter 220 on the second substrate 200 without additional etching process. The coating and patterning processes of the color layer may be performed three times to form red, green and blue color filters.

Figure 7H:
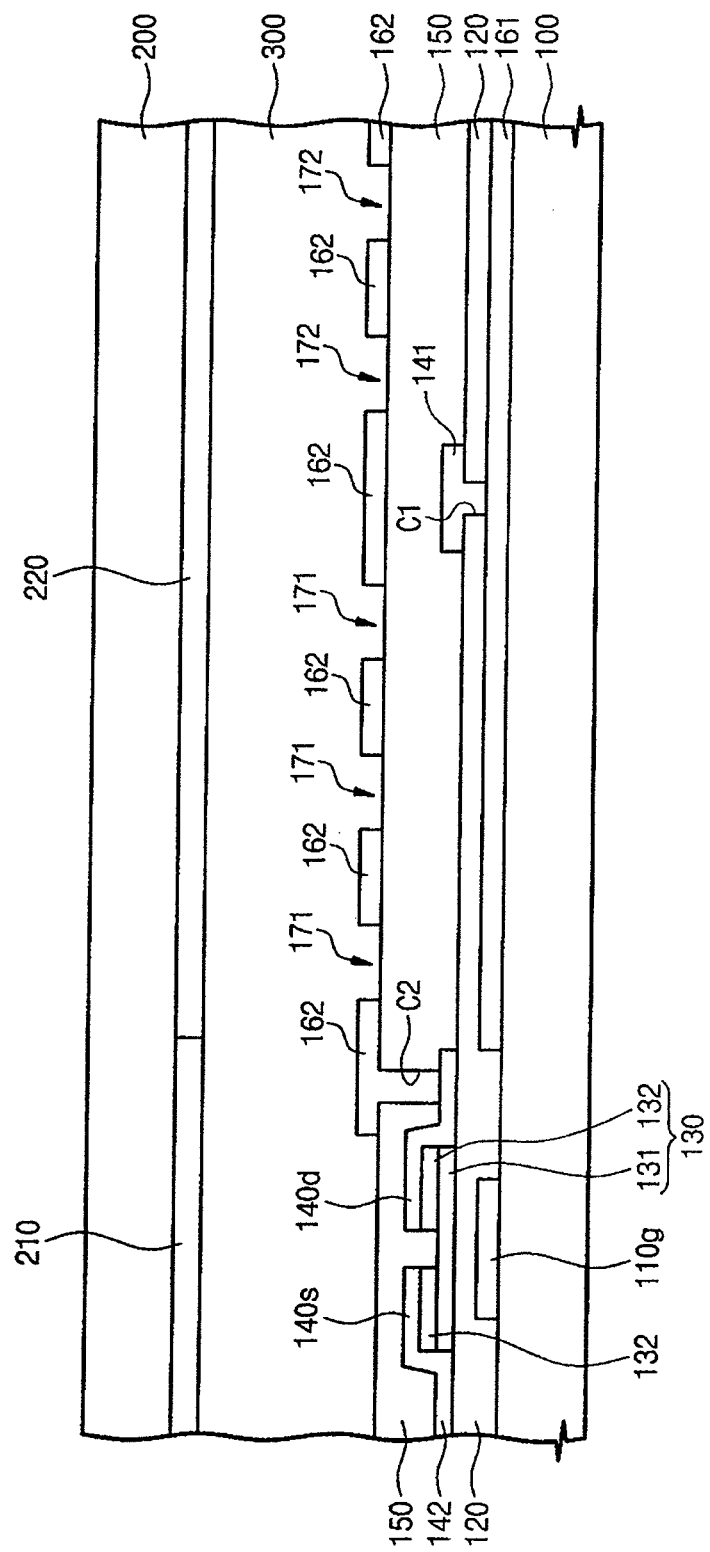

Referring to FIG. 7H, the liquid crystal layer 300 is formed between the first and second substrates 100 and 200, and the first and second substrates 100 and 200 are coupled with each other. The liquid crystal layer 300 may be formed by an injection method or a dropping method. According to the injection method, the first and second substrates 100 and 200 are coupled with each other using a curable resin, a portion of the curable resin is removed to form an opening, and the liquid crystal molecules 310 are injected into between the first and second substrates 100 and 200 through the opening. According to the dropping method, the curable resin is formed along end portion of the first substrate 100, the liquid crystal molecules 310 are dropped on the first substrate 100, and the second substrate 200 is attached to the first substrate 100 while curing the curable resin.

Figure 8:
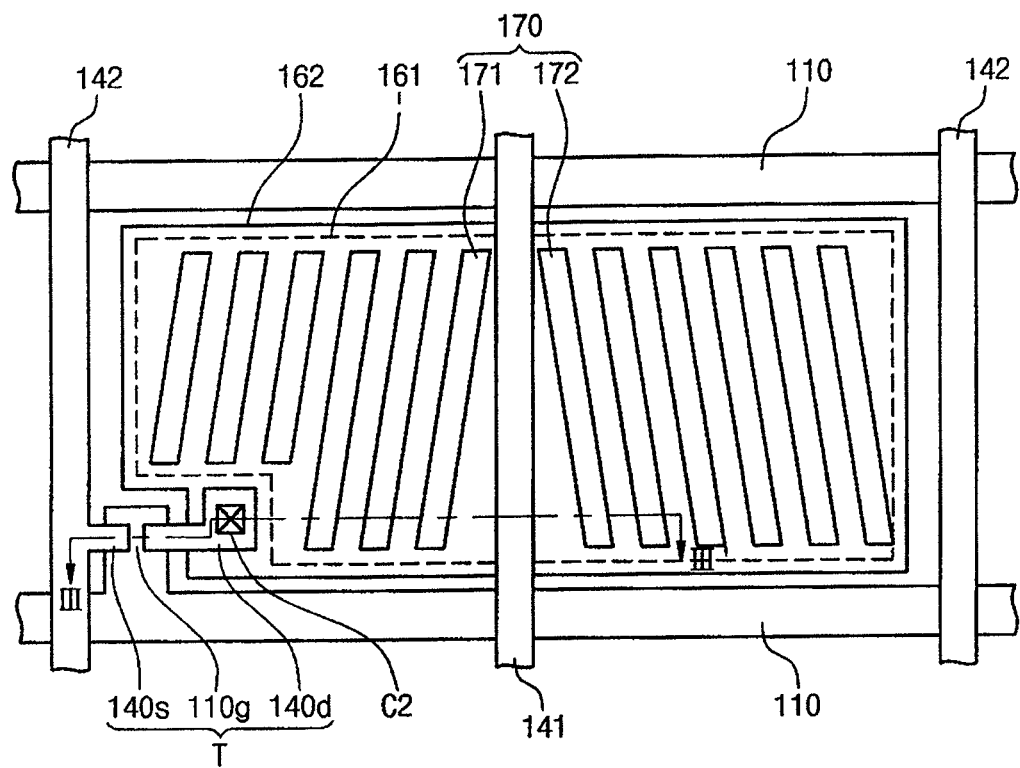
FIG. 8 is an enlarged plan view showing one pixel area of FIG. 1 an exemplary embodiment of the present invention.

FIG. 8 is an enlarged plan view showing a pixel area of FIG. 1 according to an exemplary embodiment of the present invention. In FIG. 8, the same reference numerals denote the same or similar elements in FIG. 2, and thus the detailed descriptions of the same or similar elements will be omitted.

Referring to FIG. 8, the thin film transistor T, the common electrode 161 and the pixel electrode 162 are arranged in the pixel area PA. The thin film transistor T includes the gate electrode 110g, the source electrode 140s, and the drain electrode 140d. The common electrode 161 overlaps the pixel electrode 162.

The common electrode 161 is connected to the first data line 141. The pixel electrode 162 is electrically connected to the second data line 142 through the second contact hole C2. The pixel electrode 162 includes the cut-away portions 170 formed therethrough. The cut-away portions 170 include the first cut-away portion 171 and the second cut-away portion 172. The first data line 141 divides the pixel area PA into two areas, and the first and second cut-away portions 171 and 172 are substantially symmetrical with each other and inclined with respect to the first data line 141.

Figure 9:
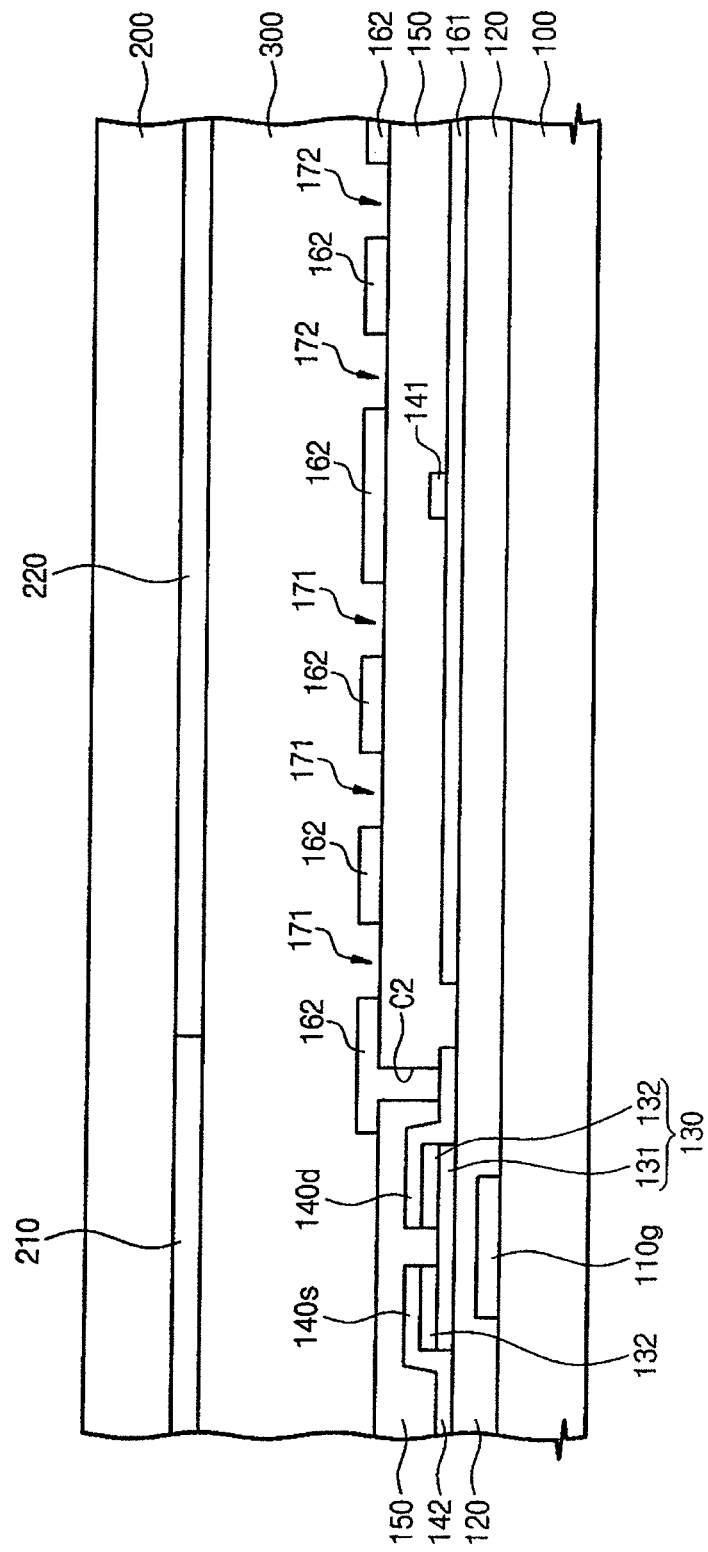
FIG. 9 is a cross-sectional view taken along a line III-III' of FIG. 8.

FIG. 9 is a cross-sectional view taken along a line III-III' of FIG. 8.

Referring to FIG. 9, the gate electrode 110g is formed on the first substrate 100 and covered by the gate insulating layer 120. The semiconductor pattern 130, the common electrode 161, and the first and second data lines 141 and 142 are formed on the gate insulating layer 120. The semiconductor pattern 130 partially overlaps the gate electrode 110g and includes the active pattern 131 and the ohmic contact pattern 132. The first and second data lines 141 and 142 are spaced apart from each other, and the first data line 141 is connected to an upper surface of the common electrode 161. The source and drain electrodes 140s and 140d are formed on the semiconductor pattern 130.

The common electrode 161, the source electrode 140s, the drain electrode 140d, and the first and second data lines 141 and 142 are covered by the protective layer 150. The protective layer 150 includes the second contact hole C2 formed therethrough to partially expose the drain electrode 140d. The pixel electrode 162 is formed on the protective layer 150 and electrically connected to the drain electrode 140d through the second contact hole C2. The black matrix pattern 210 and the color filter 220 are formed on the second substrate 200.

The first data line 141 is electrically connected to the common electrode 161 through the first contact hole C1. In an exemplary embodiment, the first data line 141 may be directly formed on the common electrode 161.

The first data line 141 includes a metal material having good conductivity. The metal material may block light passing therethrough, so that the aperture of the pixel area PA is reduced by a size of the first data line 141. Thus, the size of the first data line 141 should be minimized to maximize the aperture of the pixel area PA. The first data line 141 is positioned between the first and second sub areas. The liquid crystal molecules 310 positioned between the first and second sub areas are scattered, so that the region between the first and second sub areas is maintained in the dark state. Thus, although the first data line 141 is formed crossing the pixel area PA, the aperture ratio of the liquid crystal display may not be further reduced by the first data line 141 since the first data line 141 is formed in the region between the first and second sub areas, which is maintained in the dark state.

The liquid crystal display according to the exemplary embodiment of the present invention may maintain the maximum aperture ratio, so that the high-quality image may be displayed on the liquid crystal display.

FIGS. 10A to 10H are sectional view illustrating a liquid crystal display of FIG. 9.

Figure 10A:
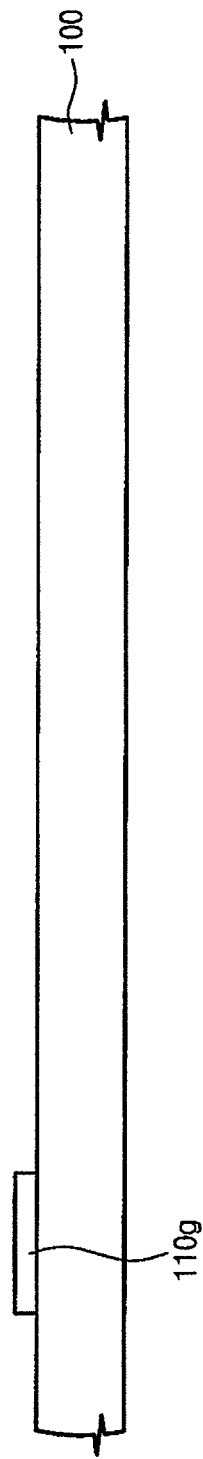
FIGS. 10A to 10H are sectional views illustrating a liquid crystal display of FIG. 9.

Referring to FIG. 10A, the gate conductive layer is formed on the first substrate 100. The gate conductive layer is etched to form the gate electrode 110g. In an exemplary embodiment, the gate line 110 is formed with the gate electrode 110g when the gate conductive layer is etched.

Figure 10B:
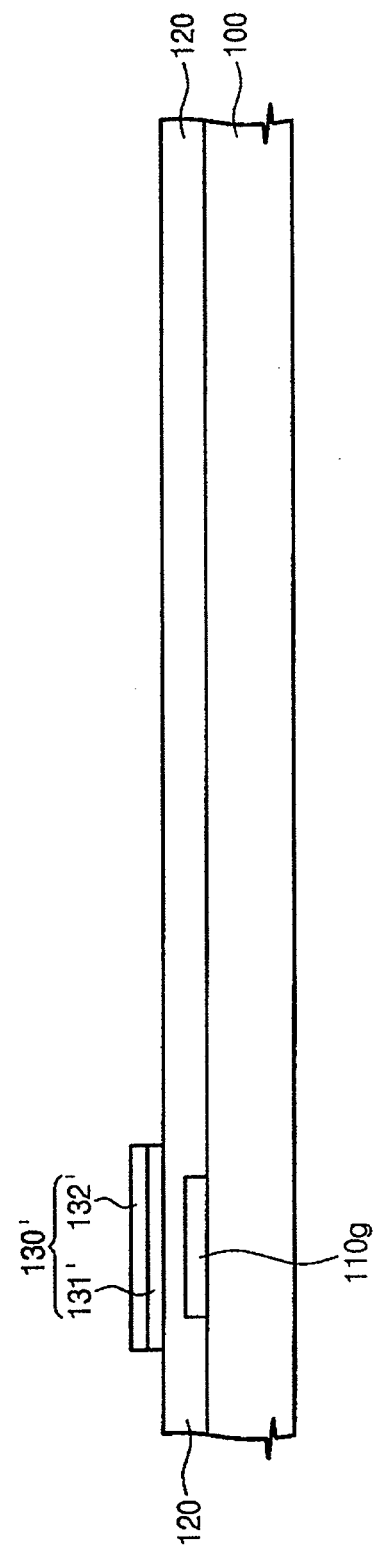

Referring to FIG. 10B, the gate insulating layer 120 is formed over the first substrate 100. The semiconductor layer is formed on the gate insulating layer 120 and etched to form the preliminary semiconductor pattern 130'. The preliminary semiconductor pattern 130' includes the preliminary active pattern 131' and the preliminary ohmic contact pattern 132' formed on the preliminary active pattern 131'.

Figure 10C:
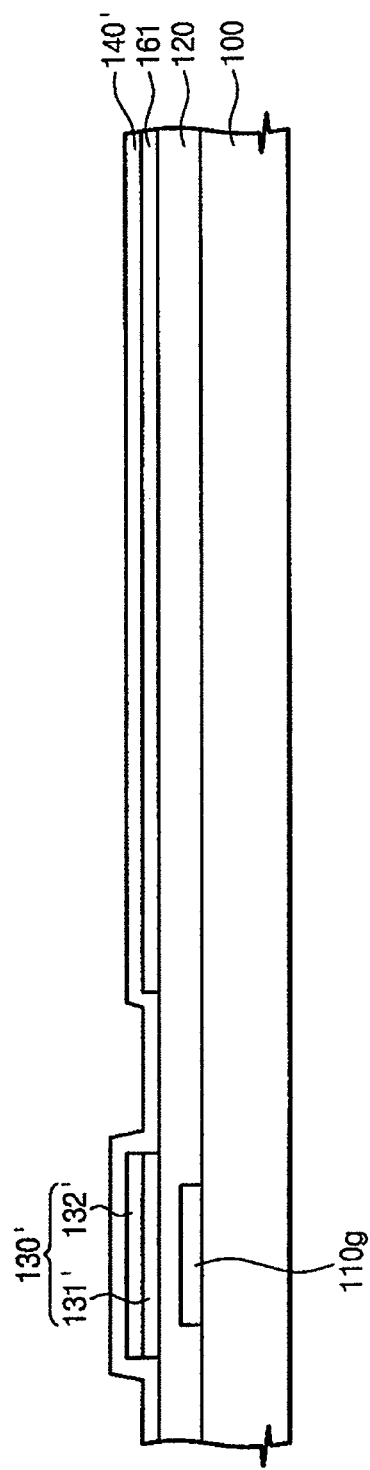

Referring to FIG. 10C, the transparent conductive layer is deposited on the gate insulating layer 120. The transparent conductive layer is etched to form the common electrode 161. The data conductive layer 140' is deposited over the first substrate 100 to cover the preliminary semiconductor pattern 130' and the common electrode 161.

Figure 10D:
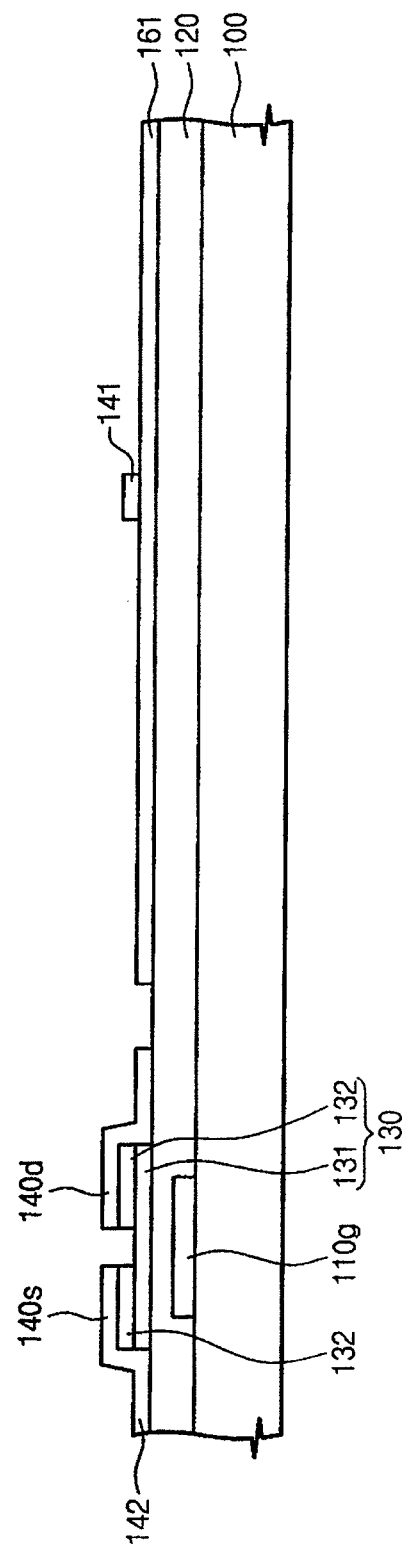

Referring to FIG. 10D, the data conductive layer 140' is etched to form the source electrode 140s, the drain electrode 140d, the first data line 141, and the second data line 142. The first data line 141 is connected to the upper surface of the common electrode 161. When the preliminary semiconductor pattern 130' is etched along the source electrode 140s and the drain electrode 140d, the semiconductor pattern 130 is formed. The semiconductor pattern 130 includes the active pattern 131 and the ohmic contact pattern 132.

Figure 10E:
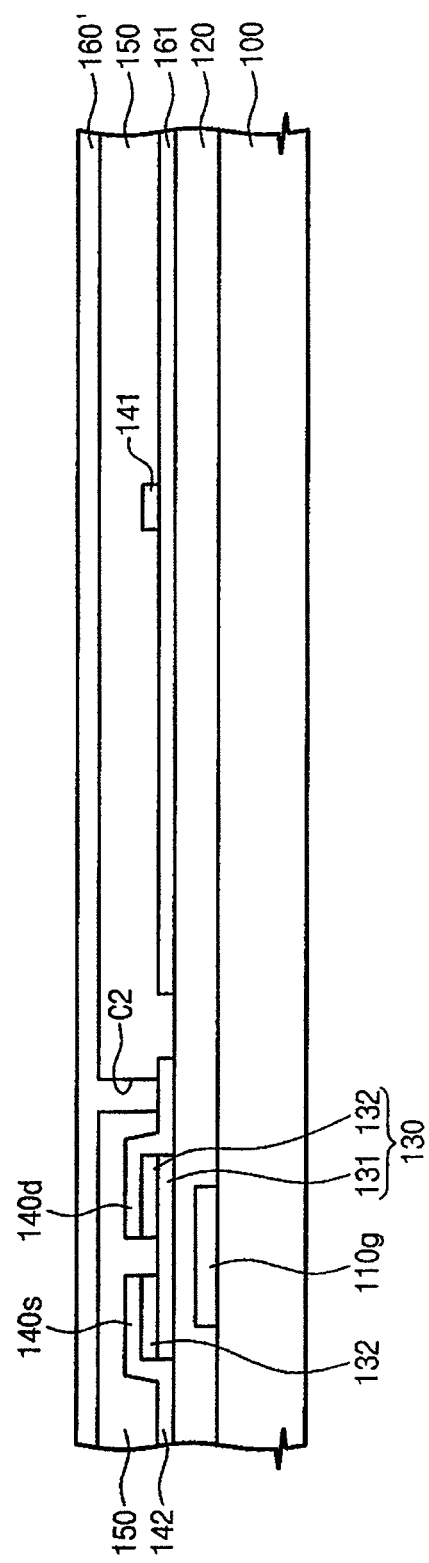

Referring to FIG. 10E, the protective layer 160 is formed over the first substrate 100. The protective layer 160 includes the second contact hole C2 formed therethrough to expose the drain electrode 140d. The transparent conductive layer 160' is formed over the first substrate 100.

Figure 10F:
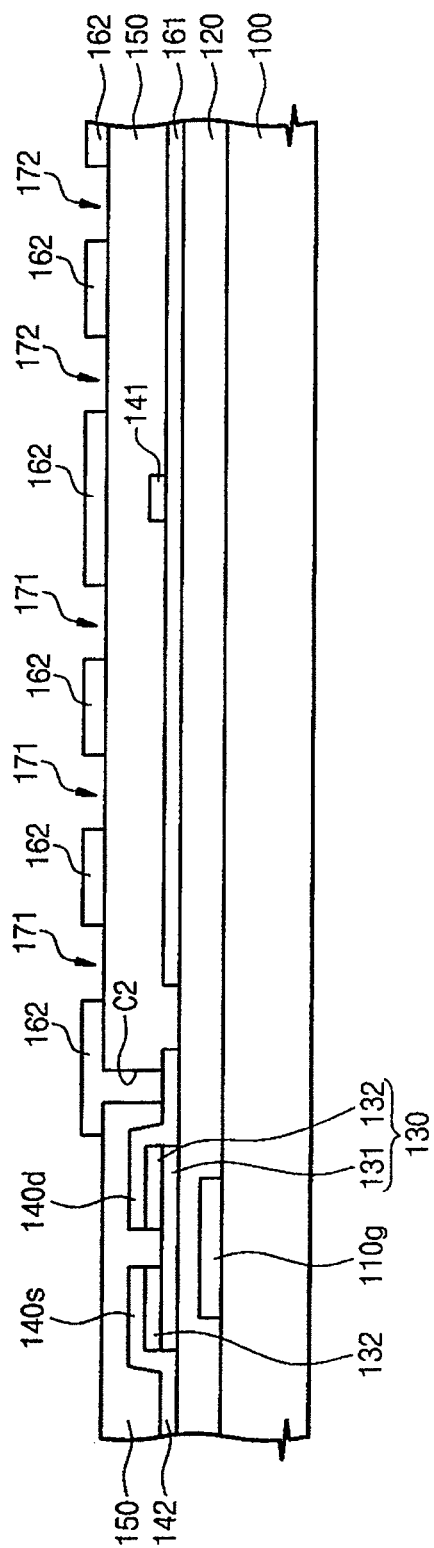

Referring to FIG. 10F, the transparent conductive layer 160' is etched to form the pixel electrode 162. The second contact hole C2 is filled with the transparent conductive layer 160', and the pixel electrode 162 is electrically connected to the drain electrode 140d through the second contact hole C2. The pixel electrode 162 includes the cut-away portion 170 formed therethrough.

Figure 10G:
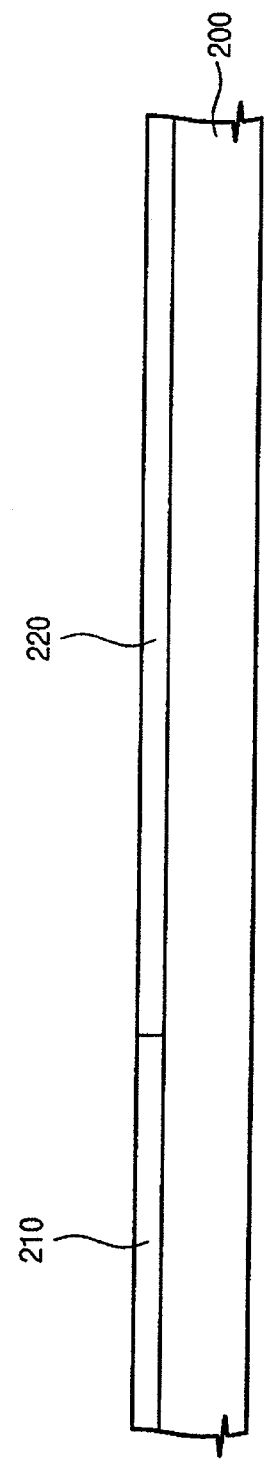

Referring to FIG. 10G, the black matrix layer is formed on the second substrate 200. The black matrix layer is etched to form the black matrix pattern 210. The patterning process for the black matrix layer may be performed through exposure and development processes without additional etching process. The color layer is coated over the second substrate 200 to cover the black matrix pattern 210. When the color layer is patterned, the color filter 220 is formed. The patterning process for the color layer may be performed through exposure and development processes without additional etching process.

Figure 10H:
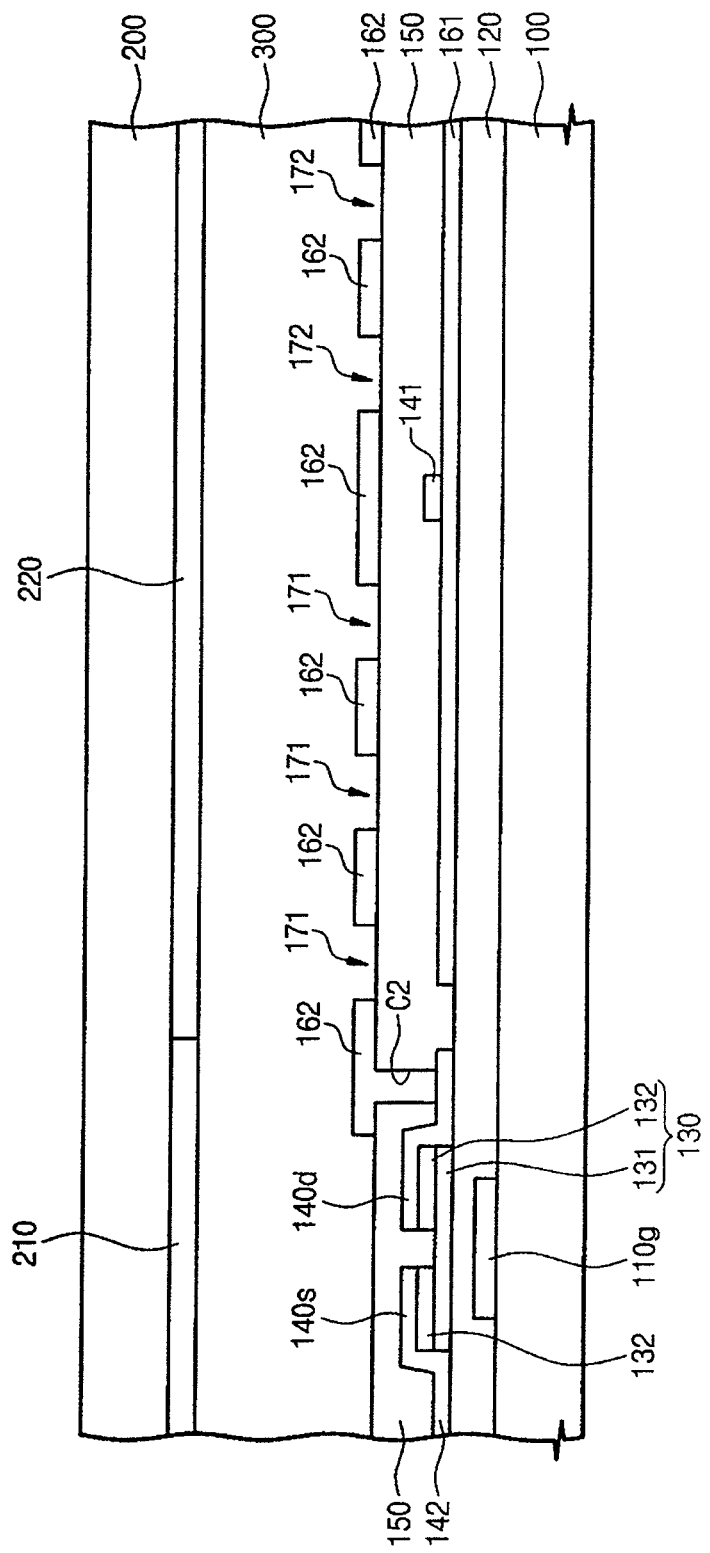

Referring to FIG. 10H, the liquid crystal layer 300 is formed between the first and second substrates 100 and 200, and the first and second substrates 100 and 200 are coupled with each other. The liquid crystal layer 300 may be formed using an injection method or a dropping method.

According to the above, the liquid crystal display may improve the aperture ratio, thereby displaying a high quality image.

Although the exemplary embodiments of the present invention have been described herein with reference with the accompanying drawings, it is understood that the present invention is not limited to these exemplary embodiments, and that various other changes and modifications may be affected therein by one of ordinary skill in the related art without departing from the scope or spirit of the invention. All such changes and modifications are intended to be included within the scope of the invention as defined by the appended claims.

What is claimed is:

1. A display apparatus comprising:
a first substrate comprising a pixel area defined therein;
a gate line extending in a first direction and a common electrode formed on the first substrate;
a first insulating interlayer formed on the first substrate to cover the gate line;
a common line and a data line formed on the first insulating interlayer, the common line crossing the pixel area, wherein the common line and the data line extend in a second direction perpendicular to the first direction;
a second insulating interlayer formed on the first insulating interlayer to cover the common line and the data line;
a pixel electrode formed on the second insulating interlayer, the pixel electrode covering part of the pixel area, overlapping the common electrode, having a plurality of cut-away portions within the pixel electrode, and receiving a voltage through the data line; and
a second substrate facing the first substrate,
wherein the pixel area is formed between adjacent gate lines and adjacent data lines and having a first length in the first direction longer than a second length in the second direction,
wherein the common line is perpendicular to the first direction and divides the pixel area into a first sub area and a second sub area, the cut-away portions comprising first cut-away portions formed in the first sub area and second cut-away portions formed in the second sub area, the first and second cut-away portions being inclined in different directions,
wherein the common electrode receives a voltage through the common line and covers part of the pixel area, and
wherein one of the first cut-away portions more distal from the common line has a shorter length than another of the first cut-away portions more proximal to the common line.

2. The display apparatus of claim 1, further comprising a sub-line formed on the first substrate and spaced apart from the gate line, wherein the sub-line is electrically connected to an end portion of the common line.

3. The display apparatus of claim 2, wherein the common line is electrically connected to the sub-line through a contact hole formed through the first insulating interlayer.

4. The display apparatus of claim 1, wherein the first and second cut-away portions are substantially symmetrical with each other with respect to the common line.

5. The display apparatus of claim 1, wherein the common line and the data line comprise a same material.

6. The display apparatus of claim 1, wherein the common electrode is formed under the first insulating interlayer, and is electrically connected to the common line through a contact hole formed through the first insulating interlayer.

7. The display apparatus of claim 1, further comprising:
a gate electrode formed on the first substrate and branched from the gate line;

a source electrode partially overlapping the gate electrode, wherein the source electrode is branched from the data line; and a drain electrode spaced apart from the source electrode, wherein the drain electrode is electrically connected to the pixel electrode.

8. The display apparatus of claim 2, wherein the data line is positioned at an edge of the pixel area, crosses the gate line and is electrically insulated from the sub-line.

9. The display apparatus of claim 1, wherein the common line does not overlap the cut-away portions.

10. A display apparatus comprising:
a first substrate comprising a pixel area defined therein as formed between adjacent gate lines and adjacent data lines and having a first length in a first direction longer than a second length in a second direction;
a gate line on the first substrate;
a common line and a second data line insulatedly crossing the gate line, the common line crossing the pixel area and being perpendicular to the first direction;
a first transparent electrode and a second transparent electrode, wherein one electrode of the first transparent electrode and the second transparent electrode has plate shape, the one electrode is insulatedly overlapped by the other electrode of the first transparent electrode and the second transparent electrode, and the other electrode has a plurality of cut-away portions within the other electrode; and
a second substrate facing the first substrate,
wherein the cut-away portions comprise first cut-away portions and second cut-away portions, and the first and second cut-away portions are inclined in different directions,
wherein the one electrode of the first transparent electrode and the second transparent electrode is connected to the common line through a first contact hole and the other electrode of the first transparent electrode and the second transparent electrode is connected to the data line, and
wherein one of the first cut-away portions more distal from the common line has a shorter length than another of the first cut-away portions more proximal to the common line.

11. The display apparatus of claim 10, wherein the first and second cut-away portions are substantially symmetrical with each other with respect to the common line.

12. The display apparatus of claim 10, further comprising a sub-line formed on the first substrate and spaced apart from the gate line, wherein the sub-line is electrically connected to an end portion of the common line.

13. The display apparatus of claim 12, further comprising a first insulating interlayer formed on the first substrate to cover the gate line, wherein the commmon line is electrically connected to the sub-line through a second contact hole formed through the first insulating interlayer.

14. The display apparatus of claim 10, wherein the common line and the data line comprise a same material.

15. The display apparatus of claim 10, further comprising a first insulating interlayer formed on the first substrate to cover the gate line, wherein the first insulating interlayer is formed between the one electrode of the first transparent electrode and the second transparent electrode and the first contact hole is formed through the first insulating layer.

16. The display apparatus of claim 15, wherein the contact hole overlaps the common line, and the common line comprises a first area overlapped the contact hole and a second area except the first area, 17. The display apparatus of claim 16, a width of the first area is more than a width of the second area.

18. The display apparatus of claim 10, further comprising:
a gate electrode branched from the gate line;
a source electrode partially overlapping the gate electrode, wherein the source electrode is branched from the data line; and
a drain electrode spaced apart from the source electrode, wherein the drain electrode is electrically connect to the other electrode of the first transparent electrode and the second transparent electrode.

19. The display apparatus of claim 12, wherein the data line is positioned at an edge of the pixel area, and is electrically insulated from the sub-line.

20. The display apparatus of claim 10, wherein the pixel area formed in a rectangular shape which has a first length in an extension direction of the gate line longer than a second length in an extension direction of the common line and the data line.

21. The display apparatus of claim 10, wherein the common line divides the pixel area into a first subarea and a second sub area, the first cut-away portions are formed in the first sub area, and the second cut-away portions are formed in the second sub area.

22. The display apparatus of claim 10, wherein the common line does not overlap the cut-away portions.

* * * * *